United States Patent [19]

Lakatos

[11] Patent Number: 4,889,166

[45] Date of Patent: Dec. 26, 1989

[54] VORTEX VALVES

[75] Inventor: Daniel Lakatos, Scarborough, Me.

[73] Assignee: Hydro International Limited, England

[21] Appl. No.: 141,751

[22] Filed: Jan. 11, 1988

[30] Foreign Application Priority Data

Oct. 14, 1987 [GB] United Kingdom ................. 8724143

[51] Int. Cl.[4] ............................................... F16C 1/16

[52] U.S. Cl. .................................... 137/813; 137/810; 251/294; 251/300

[58] Field of Search ............... 137/808, 810, 811, 813; 251/117, 126, 294, 300

[56] References Cited

U.S. PATENT DOCUMENTS

| | | | |
|---|---|---|---|
| 2,302,972 | 11/1942 | Nuckols | 251/300 X |
| 2,642,089 | 6/1953 | Christie | 251/294 X |
| 3,195,303 | 7/1965 | Widell | 137/813 X |
| 3,219,048 | 11/1965 | Palmisano | 137/813 |
| 3,513,865 | 5/1970 | Van Der Heyden | 137/813 |
| 3,521,657 | 7/1970 | Ayers | 137/813 |
| 3,612,093 | 10/1971 | Gramse | 251/300 X |
| 3,638,672 | 2/1972 | Smith et al. | 137/813 |
| 4,177,947 | 12/1979 | Menzel | 251/126 |
| 4,206,783 | 6/1980 | Brombach | 137/808 X |

FOREIGN PATENT DOCUMENTS 2141561A 12/1984 United Kingdom .

OTHER PUBLICATIONS

Das Gas–und Waserfach, vol. 123, No. 3, 1982, pp. 166–167 "Mehr als 500 Wirbeldrosseln und Wirbelveentile im Einsatz" (and English translation).

*Primary Examiner*—John Rivell
*Attorney, Agent, or Firm*—Larson and Taylor

[57] ABSTRACT

There is provided a vortex-valve which comprises a housing defining a vortex chamber, a housing having an inlet through which liquid may enter the vortex chamber in manner to promote swirl within the vortex chamber and an outlet at one axial end of the vortex chamber. A wall of the housing is provided with an opening which is normally closed by a closure, this closure being operable between the closed position and an open position in which liquid may enter the vortex chamber bypassing the inlet. The vortex-valve may be provided at the outlet of a gully and is useful in enabling a blockage, which may occur at the inlet of the vortex-valve, to be by-passed, thereby draining any accumulated liquid in the gully. The blockage may then be removed when the gully is relatively dry.

7 Claims, 3 Drawing Sheets

VORTEX VALVES

This invention relates to vortex valves and is more particularly concerned with a vortex valve including a means by which the inlet to the valve may be by-passed.

Vortex valves are devices for controlling fluid flow by a hydraulic effect without requiring moving parts. U.S. Pat. No. 4206783 discloses a vortex valve having a conical vortex chamber with a tangential inlet and an outlet disposed at the narrower end of the chamber. At low flow rates, water entering through the inlet passes through the vortex chamber to the outlet with substantially no pressure drop and the valve can be considered to be open. However, at high flow rates, water enters through the inlet with enough energy to create a vortex in the vortex chamber which results in a considerable pressure drop between the inlet and the outlet and may greatly restrict flow through the outlet, or even substantially cut it off altogether. Thus the valve serves to limit the rate of flow through it automatically. Vortex valves of this type can be used, for example, to control the flow of storm water in sewers, to ensure that equipment downstream of the valve is not overloaded during periods of heavy rainfall.

One problem with prior art vortex valves is that the vortex chamber, or the inlet to the vortex chamber, may become blocked by debris from the gully in which the vortex valve is fitted. This causes liquid to build up in the gully, submerging the vortex valve and requires unpleasant and difficult maintenance and cleaning work to be carried out in removing the blockage under water.

According to a first aspect of the present invention there is provided a vortex valve comprising a housing defining a vortex chamber, the housing having an inlet through which liquid may enter the vortex chamber in a manner to promote swirl within the vortex chamber and an outlet at one axial end of the vortex chamber, a wall of the housing being provided with an opening normally closed by a closure, said closure being operable between the closed position and an open position in which liquid may enter the vortex chamber by-passing said inlet.

The vortex valve may be provided at the outlet of a gully and, according to a second aspect of the present invention there is provided a gully having an outlet which communicates with the interior of the gully through a vortex valve, said vortex valve comprising a housing defining a vortex chamber, the vortex chamber communicating with the gully through an inlet through which liquid may enter the vortex chamber in a manner to promote swirl within the vortex chamber, an outlet being provided at one axial end of the vortex chamber and a wall of the housing being provided with an opening normally closed by a closure, said closure being operable between the closed position and an open position in which liquid may enter the vortex chamber from the gully by-passing the liquid inlet.

When a blockage occurs at the inlet of the vortex valve, and water builds up in the gully in which the vortex valve is situated, the closure is moved (either manually or automatically) to the open position, permitting the flooded gully to empty, the liquid in the gully by-passing the inlet. Once the gully is empty, the vortex valve is readily accessible and the inlet easily cleaned. In some circumstances, the flow created when the closure is moved may dislodge debris in the vortex chamber or the inlet and cause it to pass through the outlet, so permitting the flooded gully to empty.

Preferably, the closure is held in the normally closed position by a spring which tends to urge the closure against a stop. It is not essential to provide an elaborate sealing means between the closure and the housing as the liquid head in the gully will normally be sufficient to press the closure tightly against the housing. When the gully is dry or substantially dry, the vortex valve is in a "dormant" state and the presence of a pressure head of liquid in the gully to press the closure tightly against the housing is not required.

Preferably, the closure is operable between the closed position and the open position by means remote fromt he vortex valve. Thus, for instance, a cord may be attached to the closure, the cord leading out of the gully in which the valve is situated, for remote opening of the closure.

Alternatively, a waterproof electrical actuator may be provided, responsive to a signal generated remotely, to open the closure.

Although the term "gully" is often used to mean a road gully, its intended meaning herein is broad and covers any liquid collection region or liquid interceptor through which liquid may flow.

According to a third aspect of the present invention, there is provided a method of unblocking a blocked vortex valve situated at the outlet of a flooded gully, said vortex valve comprising a housing defining a vortex chamber, the housing having an inlet communicating with the gully through which liquid may enter the vortex chamber in a manner to promote swirl within the vortex chamber and an outlet at one axial end of the vortex chamber, a wall of the housing being provided with an opening normally closed by a closure and said closure being operable between the closed position and an open position in which liquid may enter the vortex chamber from the gully by-passing the liquid inlet; said method comprising:

(i) operating the closure from the normally closed position to the open position by a means remote from the vortex valve;

(ii) permitting the flooded gully to drain through the opening in the housing and the gully outlet;

(iii) removing any material blocking the vortex valve; and (iv) returning the closure to the closed position.

For a better understanding of the present invention, and to show how the same may be carried into effect, reference will now be made, by way of example only, to the accompanying drawings in which.

Figure 1:
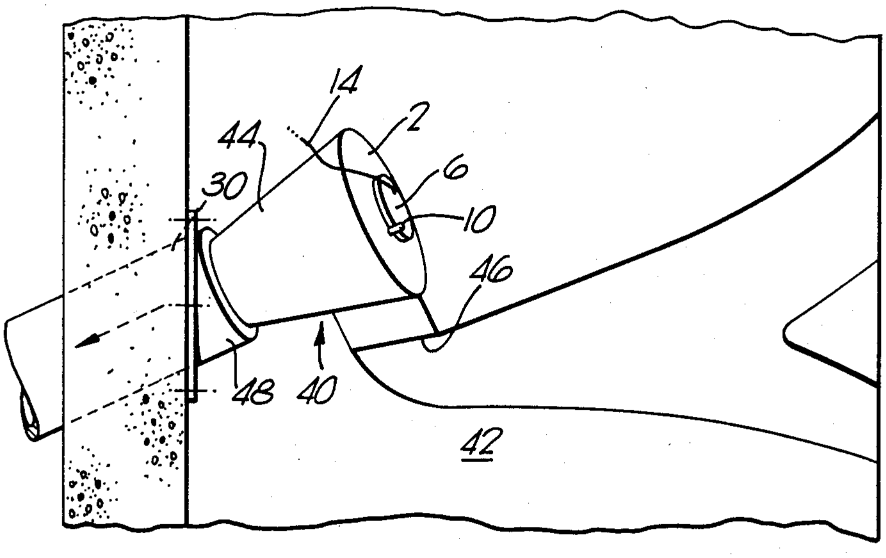
FIG. 1 is a plan view of part of a gully provide with a vortex valve.
Figure 2:
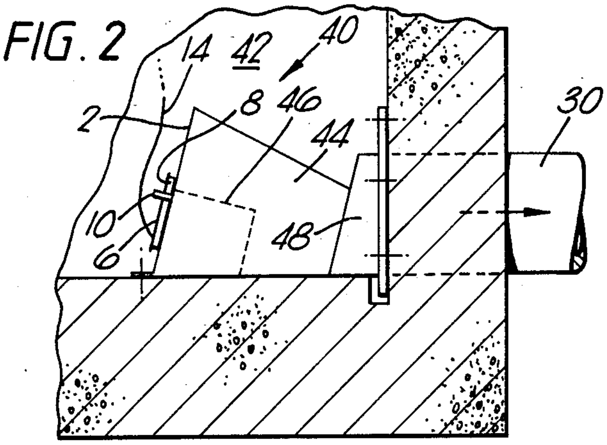
FIG. 2 is a section through the gully shown in FIG. 1.

FIGS. 1 and 2 show a vortex valve 40 in accordance with the present invention, in situ in a gully 42. The vortex valve 40 comprises a conical vortex chamber 44 having an inlet 46 and an outlet 48. The outlet 48 communicates with an outlet 30 of the gully. The end wall 2 of the valve 40 is provided with a by-pass mechanism of the type shown in FIGS. 3 to 5. Normally, the closure 6 is closed over the opening (not shown). A cord 14 attached to the closure 6 leads to a position remote from the vortex valve 40 and gully 42 where the opening and closing of the closure 6 can be controlled from an accessible position. Any water in the gully 42 enters the inlet 46 to the vortex chamber 44, passes through the vortex chamber and out of the outlet 48 thereof. During storm conditions, the rate of flow through the vortex valve 40 is sufficiently high to cause the liquid in the vortex chamber to swirl, which swirl will cause a braking effect on the flow of water through the valve 40. This will cause a built up of water in the gully 42. Thus, in storm conditions, the rate of flow of water out of the gully 42 is controlled. Should the vortex valve 40 become blocked during storm conditions, for example, by debris present in the gully which becomes trapped in the inlet 46 of valve 40, the water backs up in the gully 42 and, under extreme conditions, will flood out of the top of the gully 42. The vortex valve 40 may be unblocked by first pulling the cord 14 thereby moving the closure 6 to a position in which the opening is open. This permits water in the gully 42 to flow unimpeded through the vortex chamber 44 and out of the outlet 30, and the gully 42 soon drains. Once the gully 22 has drained, an operator can, if necessary, descend into the dry gully and unblock the vortex valve 40. Occasionally, however, it is not necessary for the vortex valve 40 to be cleaned manually as the action of the water flushing through the vortex chamber 44 may be sufficient to clean out the vortex valve.

Figure 3:
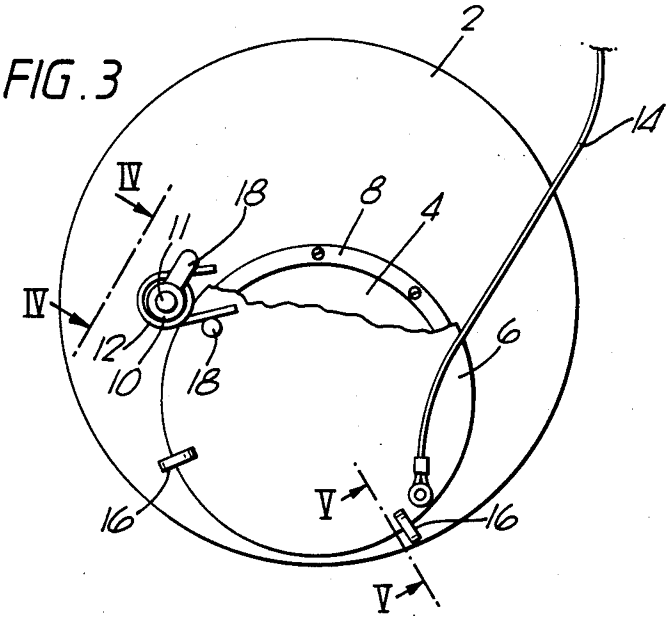
FIG. 3 shows a wall of the housing of a vortex valve in accordance with the first aspect of the present invention.
Figure 5:
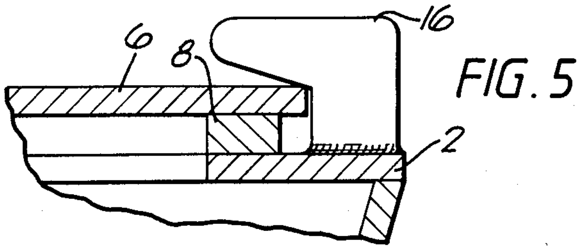
FIG. 5 is a view on the line V—V of FIG. 3.
Figure 4:
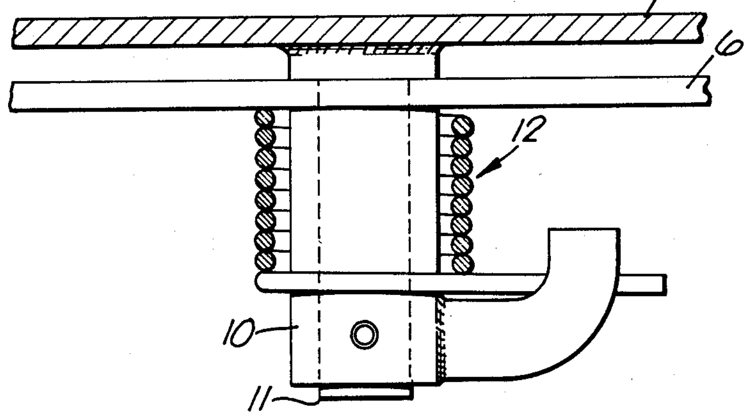
FIG. 4 is a view on the line IV—IV of FIG. 3.

In FIGS. 3, 4 and 5, a detail of a wall 2 of the housing of a vortex valve in accordance with the present invention is shown. The wall 2 shown is circular (FIG. 1), and might, for instance, be the end wall of a vortex valve such as than shown in FIGS. 1 and 2. The wall 2 of the housing is provided with a combined opening 4 and closure member 6. Associated with the closure member 6 is an annular sealing member 8, a sleeve 10, a torsion spring 12, a cord 14 and retaining lugs 16. The opening 4 is normally closed by the closure 6 with the annular seal 8 spacing apart the closure 6 and the wall 2 around the seal 8. The sleeve 10 is welded to the closure 6 and receives a spigot 11 welded to the wall 2. The closure 6 thus pivots about the spigot 11 between a position (as shown) in which the closure 6 closes the opening 4 and an open position (not shown) in which the closure 6 is pivoted away from the opening 4. Normally the spring 12 biases the closure 6 against and under the retaining lugs 16. The spring 12 is maintained under torsion by virtue of its ends being held between abutments 18. The closure 6 may be opened by pulling on the cord 14 against the action of the spring 12, causing the closure 6 to escape the capture of the retaining lugs 16 and to be pulled away from the opening 4. When the opening 4 is open, liquid may flow directly into the vortex chamber thereby by-passing the normal inlet and destroying the swirl in the vortex chamber.

Figure 6:
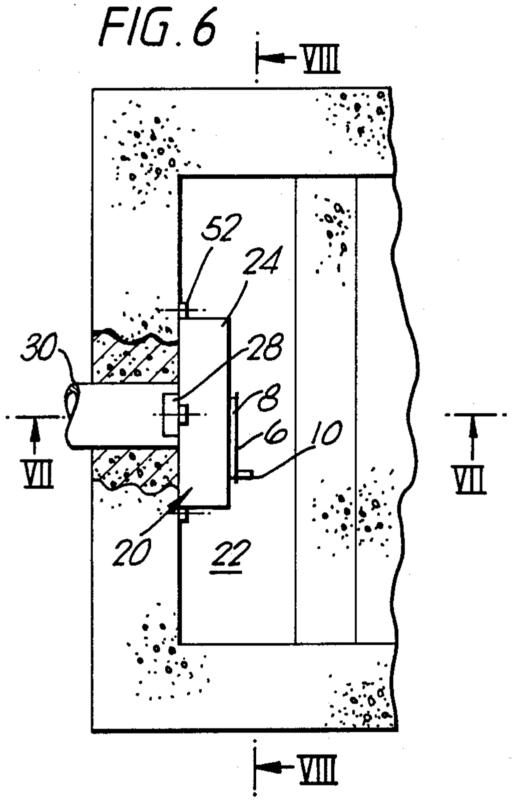
FIG. 6 is a plan view of another embodiment of a gully provided with a vortex valve.
Figure 7:
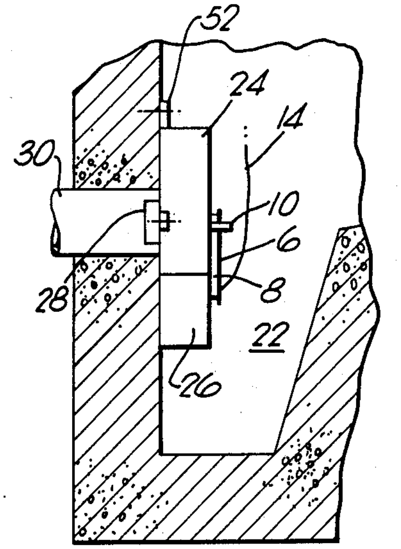
FIG. 7 is a view on the line VII—VII of FIG. 6.
Figure 8:
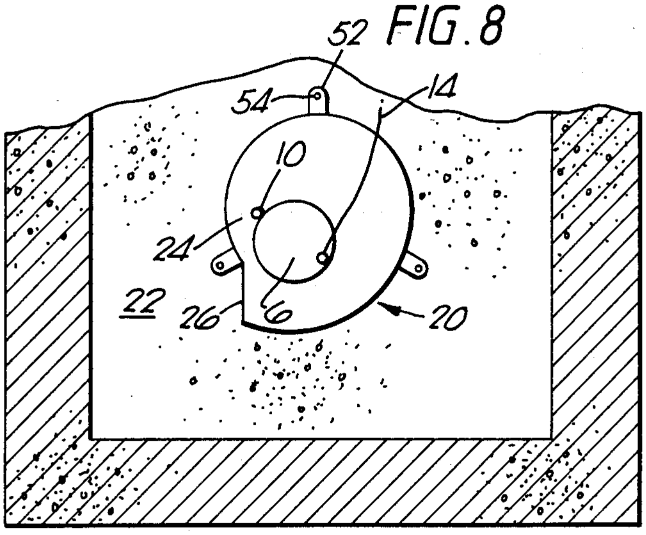
FIG. 8 is a view on the line VIII—VIII of FIG. 6.

FIGS. 6, 7 and 8 show a combination of a gully 22 and vortex valve 20 similar to that shown in FIGS. 1 and 2. In the embodiment shown in FIGS. 6, 7 and 8, however, the vortex valve 20 has a cylindrical vortex chamber 24, rather than the conical chamber 44, as shown in FIGS. 1 and 2. The principle of operation of the combined gully and vortex valve 20 shown in FIGS. 1 and 2 is, nevertheless, substantially identical to the manner of operation of the valve 40 shown in FIGS. 1 and 2.

I claim:

1. A vortex-valve comprising a housing having opposed end walls and a side wall extending between the end walls to define a vortex chamber, in which vortex chamber there is an axis of rotation between the end walls about which liquid may rotate in flowing through said housing, the housing further having an inlet in the side wall through which liquid may enter the vortex chamber in a manner to promote swirl within the vortex chamber about the axis and an outlet in one end wall of the vortex chamber, the other end wall of the housing being provided with an opening normally closed by a closure, said closure being operable by means remote from the housing between a closed position and an open position in which liquid may enter the vortex chamber by-passing said inlet.

2. A vortex-valve according to claim 1, wherein the closure is held in the normally closed position by a spring which tends to urge the closure against a stop.

3. A gully having an outlet which communicates with the interior of the gully through a vortex-valve, said vortex-valve comprising a housing having opposed end walls and a side wall extending between the end walls to define a vortex chamber, in which vortex chamber there is an axis of rotation between the end walls about which liquid may rotate in flowing through said housing, the vortex chamber communicating with the gully via an inlet in the side wall through which liuid may enter the vortex chamber in a manner to promote swirl within the vortex chamber about the axis, an outlet being provided in one end wall of the vortex chamber, and the other end wall of the housing being provided with an opening normally closed by a closure, said closure being operable by means remote from the housing between a closed position and an open position in which liquid may enter the vortex chamber from the gully by-passing the liquid inlet.

4. A gully according to claim 3, wherein the closure of the vortex-valve housing is held in the normally closed position by a spring which tends to urge the closure against a stop.

5. A gully according to claim 3, wherein a cord is attached to the closure, the cord leading out of the gully in which the valve is situated, for remote opening of the closure.

6. A method of unblocking a blocked vortex-valve situated at the outlet of a flooded gully, said vortex-valve comprising a housing having opposed end walls and a side wall extending between the end walls to define a vortex chamber, in which vortex chamber there is an axis of rotation between the end walls about which liquid may rotate in flowing through said housing, the housing further having an inlet in the side wall communicating with the gully through which liquid may enter the vortex chamber in a manner to promote swirl within the vortex chamber about the axis and an outlet in one end wall of the vortex chamber, the other end wall of the housing being provided with an opening normally closed by a closure and said closure being operable by means remote from the housing between a closed position and an open position in which liquid may enter the vortex chamber from the gully by-passing the liquid inlet; said method comprising;

(i) operating the closure from the normally closed position to the open position by the means remote from the housing to open the opening in the other end wall so that liquid enters the vortex chamber by by-passing said inlet;

(ii) permitting the flooded gully to drain through the opening in the housing and the gully outlet;

(iii) removing any material blocking the inlet of the vortex-valve; and (iv) returning the closure to the closed position.

7. In a vortex-valve comprising a housing having opposed end walls and a side wall extending between the end walls to define a vortex chamber, in which vortex chamber there is an axis of rotation between the end walls about which liquid may rotate in flowing through said housing, the housing further having an inlet in the side wall through which liquid may enter the vortex chamber in a manner to promote swirl within the vortex chamber about the axis and an outlet in one end wall of the vortex chamber; the improvement comprising a closure which normally closes an opening provided in the other end wall of the housing, said closure being operable between a closed position and an open position in which the liquid may enter the vortex chamber by-passing said inlet by means remote from the housing.

* * * * *